FILM DRIVE APPARATUS

Filed July 1, 1953 4 Sheets-Sheet 1

INVENTOR.
Frank J. Somers

BY Olin Mitchell
ATTORNEY

FILM DRIVE APPARATUS

Filed July 1, 1953 4 Sheets-Sheet 2

INVENTOR.
Frank J. Somers
BY [signature]
ATTORNEY

INVENTOR.
Frank J. Somers
BY [signature]
ATTORNEY

May 13, 1958 — F. J. SOMERS — 2,834,832

FILM DRIVE APPARATUS

Filed July 1, 1953 — 4 Sheets-Sheet 4

INVENTOR.

Frank J. Somers

BY [signature]

ATTORNEY

United States Patent Office 2,834,832

Patented May 13, 1958

2,834,832

FILM DRIVE APPARATUS

Frank J. Somers, Los Angeles, Calif., assignor to Radio Corporation of America, a corporation of Delaware Application July 1, 1953, Serial No. 365,409

11 Claims. (Cl. 178—7.2)

This invention relates to television film pickup systems, and more particularly to intermittent film drive apparatus for use in such systems.

Whereas it is customary in present film projectors for television to employ synchronous rotating motor drive operated from the A.-C. power mains, the present invention provides an electromagnetic intermittent pull-down system controlled directly by the television synchronizing pulses. Thus, film motion is dependent only on the frequency of the television synchronizing pulses, and it is, therefore, not requisite that the frequency of such pulses by synchronous with the local A.-C. power mains as in the case of rotating synchronous motor drive. This provides many practical advantages in television broadcasting operations, for example readily permitting the lap-dissolve of a film image scanned locally with an incoming picture signal from a remote point, even though the vertical synchronizing pulses associated with the remote point are not synchronous with the local A.-C. power lines.

In accordance with an embodiment of the present invention, film motion is controlled by electromagnetic actuation in accordance with suitably delayed and shaped synchronizing pulses. The film drive actuating system may include an appropriate pulse counting and mixing system whereby the actuating pulses which are derived from the synchronizing pulses may be suitably timed to provide the well known 3:2 projection sequence where motion picture and television frame rates differ. A primary advantage of such a system is, as previously mentioned, the direct dependency of film motion on synchronizing pulse frequency alone. The system readily operates at frequencies differing from 60 cycles, since the operation is determined solely by the frequency of the incoming pulses.

A further advantage of the system in the present invention is its flexibility in that the projection sequence can readily be changed, as by simple adjustment of the pulse counting and mixing system. The motion of the film can be closely controlled, to achieve desired acceleration and deceleration of the moving film, through the agency of negative feedback in the amplifying apparatus associated with the electromagnetic actuators. Another readily apparent advantage of the present invention is the elimination of cumbersome rotating parts employed in the usual mechanical film pulldown mechanisms.

Accordingly, the primary object of the present invention is to provide improved film drive apparatus for television film pickup systems.

A further object of the present invention is to provide a film pulldown system which is directly actuated in accordance with television synchronizing pulses.

It is an additional object of the present invention to provide a simple, flexible, film advancing mechanism for television film projectors whereby the utilized vertical synchronizing pulses need not be synchronous with the local A.-C. power mains.

Another object of the present invention is to provide an electronically actuated film pulldown system in which the motion of the film can be closely controlled to achieve desired conditions of acceleration and deceleration in the film advancing operation.

Other objects and advantages of the present invention will become apparent to those skilled in the art upon a reading of the following detailed description and an inspection of the accompanying drawings in which.

Figure 1:
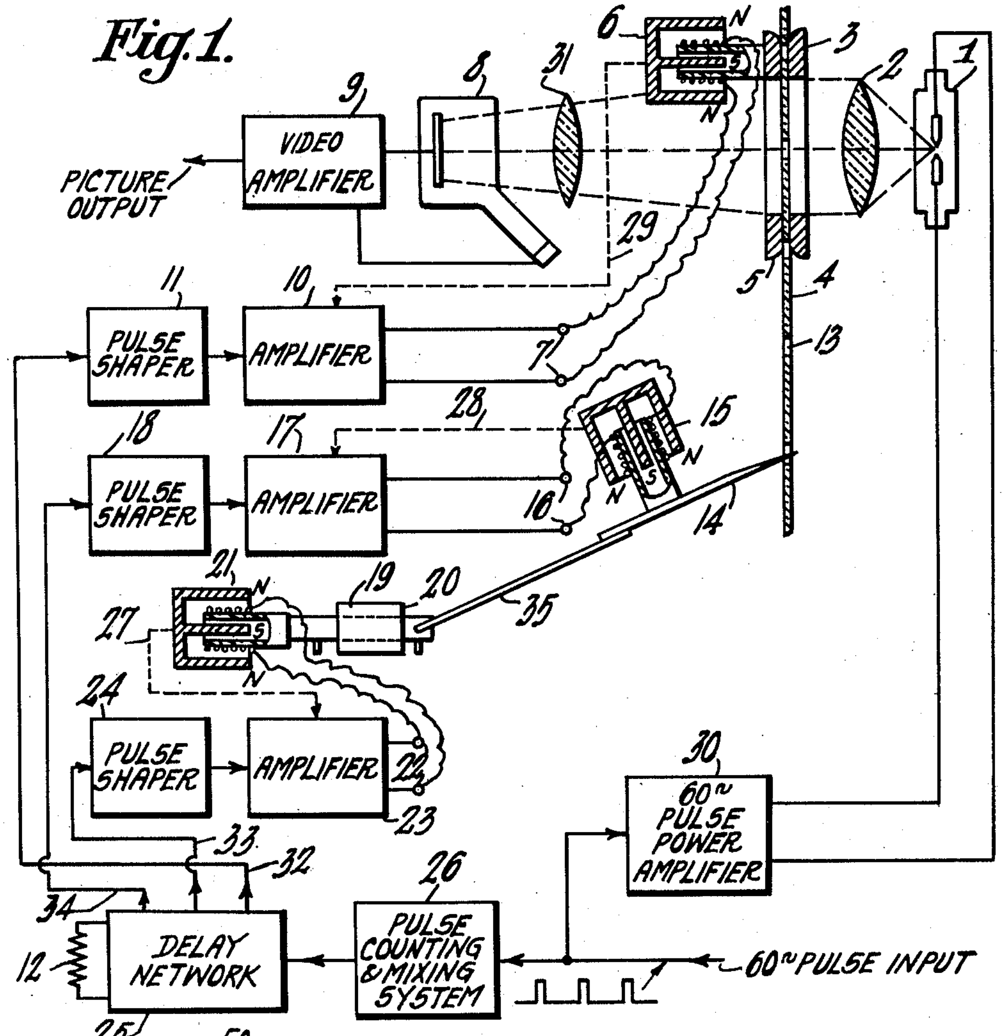
Figure 1 illustrates in simplified block and schematic form, a television film pickup system embodying the principles of the present invention.

Referring now to the drawings in greater detail, Figure 1 is a simplified diagram of the invention. Vertcal synchronizing pulses (nominally 60 cycles per second) from a suitable source (not shown) are fed into the pulse counting and mixing system 26. The output of the system 26 is a train of pulses, as shown by waveform D in Figure 3, in which the timing is such that the interval between succeeding pulses is alternately $\frac{2}{60}$ and $\frac{3}{60}$ of a second. These pulses are fed to the electrical delay network 25, which may have, for example, a frequency pass band of 6000 cycles and a total time delay of approximately 0.083 millisecond. The delay line is terminated in its characteristic impedance by resistor 12.

The same 60 cycle pulses that feed 26 are also fed to the input of amplifier 30, which is a high power pulse amplifier feeding the flash lamp 1. The flash lamp 1 may be, for example, a gas filled discharge tube such as the type FT–231 flash lamp manufactured by the General Electric Company. The output of amplifier 30 consists of a voltage pulse in the order of 8000 volts initiated by each 60 cycle pulse, the voltage being sufficient to ionize the tube 1. Tube 1 is then switched to a 20 microfarad capacitor within amplifier 30 which is charged to approximately 600 volts, and owing to the fact that discharge tube 1 has been ionized, a peak current of 50 to 100 amperes momentarily flows through tube 1 causing an intense flash of light and discharging the 20 microfarad capacitor. The duration of the light flash is somewhat less than the vertical blanking time of the television system. This type of flashing lamp arrangement is well known in the television art and a detailed description of its operation will not be given here. It will suffice to say that each incoming 60 cycle pulse causes lamp 1 to emit a brilliant flash of light of a duration somewhat less than the television vertical blanking interval.

Light from flash lamp 1 is focussed on the film 4 within the confines of the film gate 3 and the film clamping shoe 5. The image of the illuminated frame of film is picked up by the projection lens 31 and focussed on the mosaic of a pickup tube, such as an iconoscope 8, where an electron charge image is built up during the brief flash of light emitted by lamp 1. Iconoscope 8 is scanned in the normal way and the resulting video signal is amplified in amplifier 9. While the deflection apparatus associated with the iconoscope 8 has not been illustrated, it will be appreciated that it may take a conventional form, and that the deflection wave generation may be controlled by synchronizing pulses from the same source which feeds vertical synchronizing pulses to apparatus 26 and apparatus 30.

The intervals between the flashes of tube 1 are utilized for moving the film. Since the standard film sound rate is 24 frames per second and since the television scanning rate is 30 frames per second, interlaced 2:1, it is the present practice to scan the odd numbered frames of film two times, and the even numbered frames of film three times at a 60 cycle rate. This procedure allows the film to be moved at an average rate of 24 frames per second while the television scanning rate is 30 frames and 60 fields per second interlaced 2:1.

As already mentioned, the output pulses of the pulse counting and mixing system 26 are in the proper sequence for actuating a mechanism for moving the film. The function of the delay line 25 is to delay the action of the pulses until after the light flash from 1 has died away.

The earliest tap, 32, on the delay line feeds pulse shaper 11 and amplifier 10. The output of amplifier 10 is fed to the terminals 7 of the electromagnetic actuator 6 which moves the film clamping shoe 5. Thus, immediately after the light from 1 is extinguished, an output from amplifier 10 causes the film clamping shoe 5 to move back from the film freeing it for motion. A feedback path (represented in the general presentation of Figure 1 by dotted line 29) is provided between the actuator 6 and amplifier 10 to insure that the motion of 5 shall be closely controlled by the voltage applied to amplifier 10 by the pulse shaper 11. The function of pulse shaper 11 is to provide a more or less square wave voltage output, as shown by waveform E in Figure 3, rising from zero to a maximum just after the light from flash lamp 1 is extinguished and remaining at maximum until just before the next light flash, when it returns to zero causing the film to again be clamped against the gate 3 by the shoe 5.

Similarly, the next later tap 33 on the delay line feeds pulse shaper 24 and amplifier 23. The output of 23 feeds terminals 22 of electromagnetic actuator 21. Actuator 21 moves the plunger 20 in the bearing 19, causing the film advance claw 14 to engage, or disengage from the film sprocket hole 13. It should be noted that 14 is connected to 20 via the flat steel spring 35, similar to a piece of clock spring, which acts as a hinge for 14 and allows 14 to move vertically as determined by actuator 15. The output of pulse shaper 24 is approximately a rectangular curve, as shown by waveform F in Figure 3, of a duration less than the output of 11 such that the claw 13 engages the sprocket hole after shoe 5 has moved away from the film and disengages the sprocket hole just before shoe 5 moves back to again clamp the film against the gate 3. An electrical feedback path (represented in the general presentation of Figure 1 by the dotted line 27) is provided between amplifier 23 and actuator 21 to insure that the motion of 21 will closely follow the waveform fed to amplifier 23 by pulse shaper 24.

The last tap 34 on the delay line feeds pulse shaper 18, and amplifier 17. The output of amplifier 17 feeds the terminals 16 of actuator 15 whose function is to move the claw 14 in a downward direction to move the film a distance of one frame. In order to avoid tearing the film, it should be accelerated and decelerated gradually. Thus the output of pulse shaper 18 is preferably a wave rising gradually at an increasing rate for the first half of the motion and then shaped so as to gradually decelerate the film, as illustrated by waveform G in Figure 3. A feedback path (represented in Figure 1 by the dotted line 28) between the actuator 15 and the amplifier 17 is provided to insure that the motion of the claw closely follows the wave applied to the input of the amplifier.

The system described in Figure 1 will obviously operate at frequencies differing from 60 cycles since the whole process is controlled by the frequency of the incoming waves. This feature has great practical advantages in television broadcasting as where it is desired to lap-dissolve a film image scanned locally with an incoming picture signal from a remote point, especially where the incoming vertical pulses are not synchronous with the local A. C. power mains. Such a lap dissolve is not possible with present synchronous motor driven projectors. Another obvious advantage of the system is its flexibility in that the scanning sequence can readily be changed by changing the electrical adjustment of the pulse counting and mixing system 26. Also, 26 can be omitted if it is desired to scan the film at a frame rate corresponding to the incoming pulses. Another advantage is the ease with which the relative timing of the various functions can be varied by moving the taps on delay network 25. Another advantage is the precise pulldown motion that can be obtained due to the feedback amplifier system. Another advantage is the elimination of cumbersome rotating parts as used in the usual mechanical film pulldown mechanism.

Having given a general description of the invention, the component parts drawn in Figure 1 will now be described in greater detail.

Figure 2:
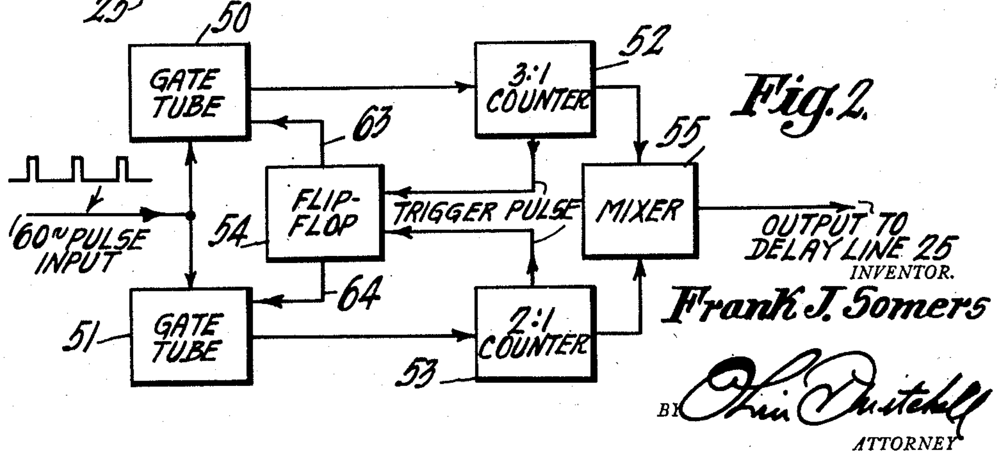
Figure 2 illustrates in block form, details of a pulse counting and mixing system which may be employed in the film drive apparatus shown in Figure 1.

Figure 2 is a block diagram of the pulse counting and mixing system 26. The 60 cycle vertical synchronizing pulses are fed to the gate tubes 50 and 51, one of which is conductive at a given time. For the purpose of explanation, we will assume gate tube 50 is conducting allowing the vertical pulses to feed the 3:1 counter 52. When three pulses have passed through the circuit a single pulse will appear at the output of 52, and will be fed into the mixer 55 and the trigger circuit of the "flip-flop" or Eccles-Jordan multivibrator 54. The output 63 of the flip-flop 54 which allowed tube 50 to conduct is now turned off and an output 64 is fed to the gate tube 51 which now becomes conducting allowing the pulses to be fed to the 2:1 counter 53. When two pulses have been counted there is an output pulse from 53 which feeds 55 and the trigger circuit of flip-flop 54. The flip-flop output 64 is thereby turned off and the output 63 turned on, rendering the gate tube 50 conducting while gate tube 51 becomes non-conducting. Thus the counters 52 and 53 operate alternately and their outputs are combined in mixer 55 so that the proper sequence of pulses for the aforementioned "3 and 2" pulldown is obtained.

Figure 3:
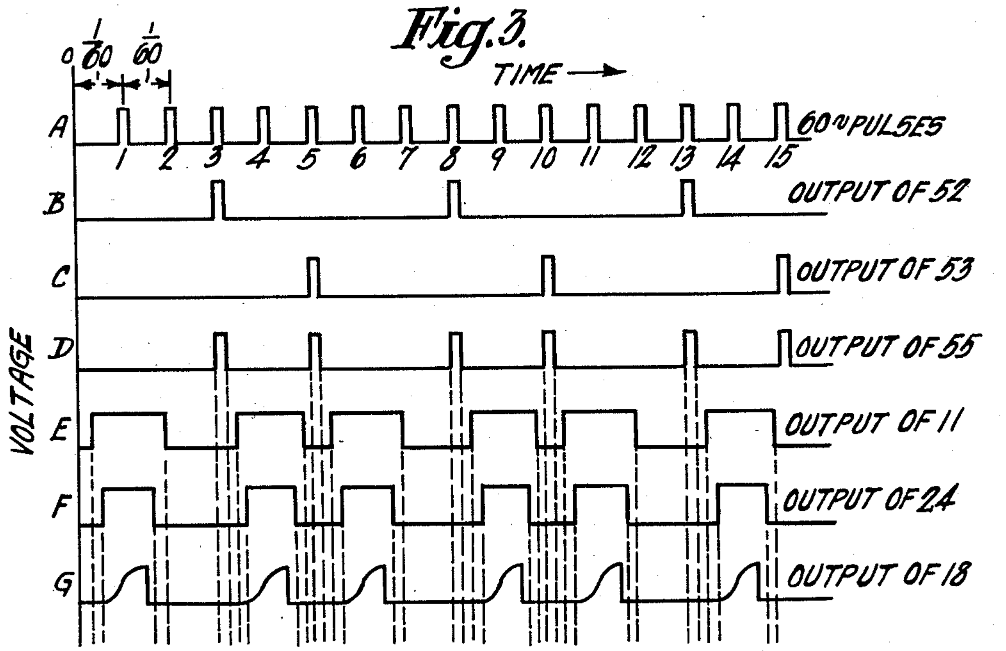
Figure 3 illustrates graphically voltage wave forms associated with the operation of the film pickup system generally illustrated in Figure 1, and more specifically illustrated in the accompanying figures.

The relative timing of the various pulses under discussion is shown in Figure 3 where A is the original train of vertical (nominally 60 cycle) pulses; B is the output of the 3:1 counter 52; C is the output of the 2:1 counter 53 and D is the output of the mixer 55.

Figure 4:
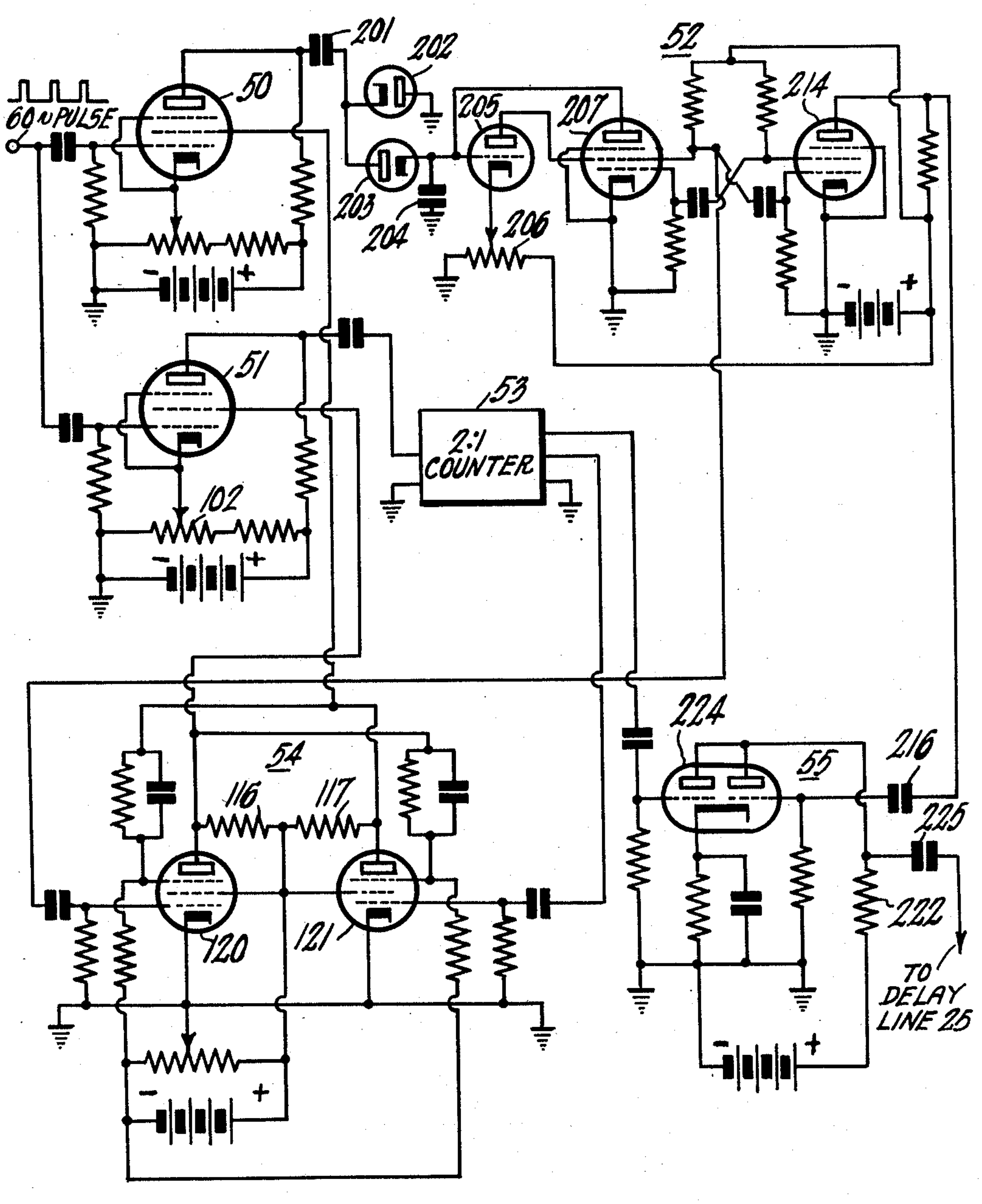
Figure 4 illustrates schematically a pulse counting and mixing system such as is shown in block form in Figure 2.

Figure 4 shows schematically representative circuit connections between the gate tubes 50 and 51, the 3:1 counter 52, flip-flop multivibrator 54, and the mixer 55. The 2:1 counter 53 is shown in block form since it may be essentially identical with counter 52, the only difference being that the potentiometer corresponding to 206 is adjusted for a 2:1 count.

The circuit operates as follows: The 60 cycle input pulses are fed to the control grids of 50 and 51 at all times. The cathode of tube 51 is maintained at a positive potential with respect to the control grid by means of the potentiometer 102 such that when tube 120 is conducting, the voltage drop across resistor 116 will cause the screen voltage of 51 to be too low for 51 to be conductive. There will therefore be no plate current in 51 and no pulse voltage at its output. When tube 120 is cut off, however, the potential at the plate of 120 will rise to a value giving 51 sufficient screen voltage for conduction and 60 cycle pulses will appear at the output and be fed to the 2:1 counter 53.

Gate tube 50 is similarly connected except that it receives its screen potential from the plate of tube 121, which is the other half of the flip-flop multivibrator 54. The operation of the flip-flop circuit is well known in the art and is described by J. G. Brainerd et al. in the book "Ultra High Frequency Techniques" published by D. Van Nostrand, New York, 1942. As shown by Brainerd, tubes 120 and 121 conduct alternately, one tube remaining completely cut off while the other is conducting. A feature of this device is that application of a negative pulse to the control grid of the conducting tube causes it to be cut off and starts the opposite tube conducting.

Thus in the present application if we assume that tube 51 is cut off, tube 50 will be conducting and pulses will be fed to the 3:1 counter 52. The circuits are so arranged that when counter 52 has counted three pulses, the negative pulse output appearing at the junction of resistor 208 and the screen of tube 207, is used as a trigger pulse to feed the grid of tube 120 which has been conducting. Tube 120 is thereby cut off and tube 121 becomes conducting. Under these conditions tube 50 will be cut off and tube 51 will begin to conduct, feeding 60 cycle pulses to the 2:1 counter 53. When counter 53 has counted two pulses, its negative pulse output is used to trigger the control grid of tube 121. Tube 121 is thereupon cut off, tube 120 becomes conducting, and pulses are fed to the 3:1 counter 53. Thus, the process is continuous with the counters operating alternately.

The counters 52 and 53 might be any of the well known forms, as for example of the type described by A. V. Bedford and J. P. Smith in their article entitled "Television synchronizing-signal generator" in the RCA Review, vol. V, Number 1, July 1940, and illustrated on page 57 of that article. The connections between the gate tube 50 and the 3:1 counter 52 are shown in Figure 4. The operation of the counter 52 is as follows: When tube 50 is conducting 60 cycle pulses are fed via condenser 201 to the diodes 202 and 203. Capacitor 201 is of a relatively low value so that a differentiated wave is fed to diodes 202 and 203. The negative excursion of the differentiated wave flows through diode 202 and is shorted to ground and is lost. The positive portion of the wave flows through diode 203 and places positive charge on condenser 204. When the third pulse reaches condenser 204, the cutoff bias placed on tube 205 by the potentiometer 206 is overcome and 205 feeds a trigger pulse to the multivibrator consisting of tubes 207 and 214. Tube 207 becomes conducting and discharges condenser 204. Thus there is a positive output pulse appearing at condenser 216 for every third pulse fed to condenser 201. This 3:1 counting condition is obtained by adjustment of potentiometer 206. The adjustment of 206 is stable and uncritical, especially for such low counting rates as we are dealing with here. The schematic diagram of the 2:1 counter 53 is identical with 52, the only difference being that the potentiometer corresponding to 206 would be adjusted for 2:1 operation.

The mixer 55 into which the two counters feed is a double triode tube 224 with a common load resistor 222, the signals from the two counters being fed into separate grids. The output from mixer 55, appearing across the load resistor 222, is fed through condenser 225 to the delay line 25.

Figure 5:
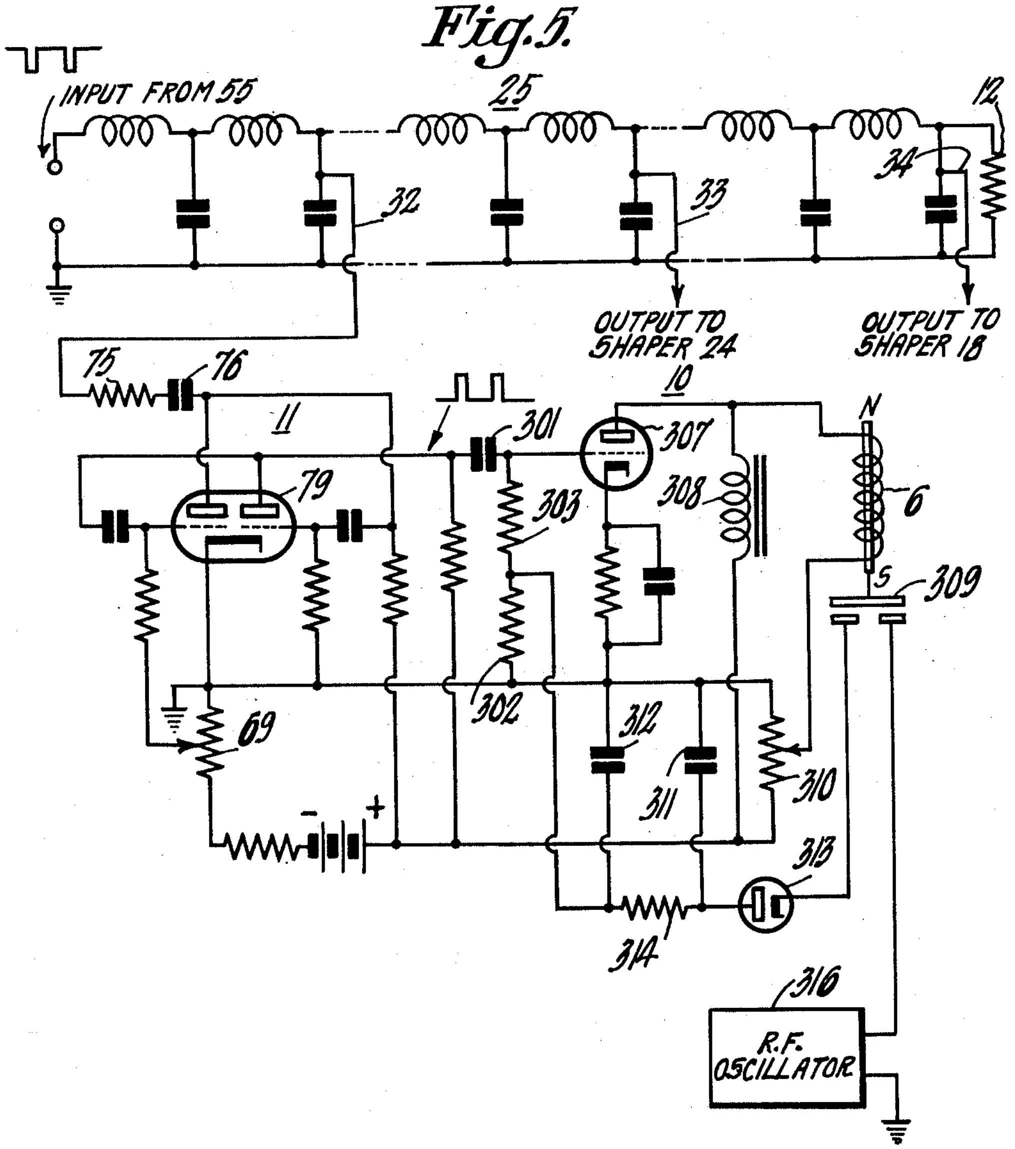
Figure 5 illustrates schematically a representative form which certain portions of the film drive actuating system of Figure 1 may take.

Figure 5 shows the delay line 25, pulse shaper 11 and amplifier 10 with its feedback loop. Negative pulses from delay line tap 32 are fed via resistor 75 and coupling condenser 76 to the double triode multivibrator tube 79. The function of resistor 75 is to minimize the effect of A. C. voltages from the multivibrator feeding back into the delay line, and capacitor 76 serves to block the D. C. voltage from the line. The shaper 11 may comprise a multivibrator of the "variable pulse width type" as illustrated in Figure 5. The operation of this type of circuit is well known in the art and has been described by A. V. Bedford and J. P. Smith in their aforementioned article in the RCA Review, volume V, Number 1, July 1940. It will suffice to say here that the proper time duration of the output wave (waveform E in Figure 3) may be obtained by adjustment of the tapping of resistor 69, while the starting time of the wave is determined by the arrival of a pulse from the delay network tap 32, applied to the multivibrator via resistor 75 and capacitor 76.

The output of shaper 11 consists of a train of positive pulses of the illustrated by waveform E in Figure 3, and is applied to amplifier 10 via condenser 301. Pulses arriving at 301 are amplified in the triode 307 and applied to the actuator 6 which moves the film clamping shoe 5. The armature of 6 is polarized, as indiacted, by permanent magnetism and film clamping shoe 5 (not shown) may be physically attached to the "N" end of the armature. The "S" end of the armature carries the movable electrode of variable capacitor 309. The winding of 6 is so connected that a positive voltage applied to the grid of 307 causes the armature to move in a direction to increase the capacitance of 309. As the capacitance of 309 increases a greater value of R. F. voltage from oscillator 316 will be fed to the cathode of diode 313. The anode of 313 connects to the junction of the grid resistors 302 and 303 via the R. F. filter consisting of resistor 314 and the capacitors 311 and 312. A negative voltage corresponding to the downward travel of the armature of 6 is therefore applied to the gird of tube 307. Thus a negative D. C. feedback voltage corresponding to the downward motion of the armature opposes the positive signal voltage applied to the grid of tube 307. Potentiometer 310 forms the two variable arms of a D. C. Wheatstone bridge while the other two arms are the D. C. resistance of inductor 308 and the sum of resistor 305 and the plate resistance of tube 307. Under static conditions (no signal applied to the grid of 307) the potentiometer 310 would be adjusted so no direct current flows through the winding of 6.

It can be seen that if the circuit is designed for a large amount of feedback, the armature of 6 will closely follow the motion required by the voltage waveform applied to 301. Any tendency of the motion of the armature to lag behind the positive swing of the input waveform will result in proportionately less negative voltage appearing at the junction of resistors 302 and 303, and a corresponding increase will occur in the net positive voltage applied to the grid of 307. This will tend to correct the error in the motion. By making the armature of 6 with small mass, providing an amplifier 307 with high peak power capabilities, by proper proportioning of capacitor 309 and by use of large amounts of negative feedback, the motion of 6 will be precisely controlled.

The feedback system shown in Figure 5 has the advantage that the sensing device 309 operates without friction and the capacitor plates can be specially shaped if other than linear feedback is desired. Other variations of the form of amplifier 10 in Figure 5 are readily possible, such as a push-pull amplifier to balance out the D. C., and utilization of a push pull capacitor as capacitor 309.

Pulse shaper 24 and amplifier 23 may be essentially the same as the arrangement shown in Figure 5, but with the starting time of the pulse being further delayed as determined by delay line tap 33, and the pulse width adjustment being set for a somewhat shorter pulse duration. The actuator 21 may be essentially the same as the actuator in Figure 5.

Figure 6:
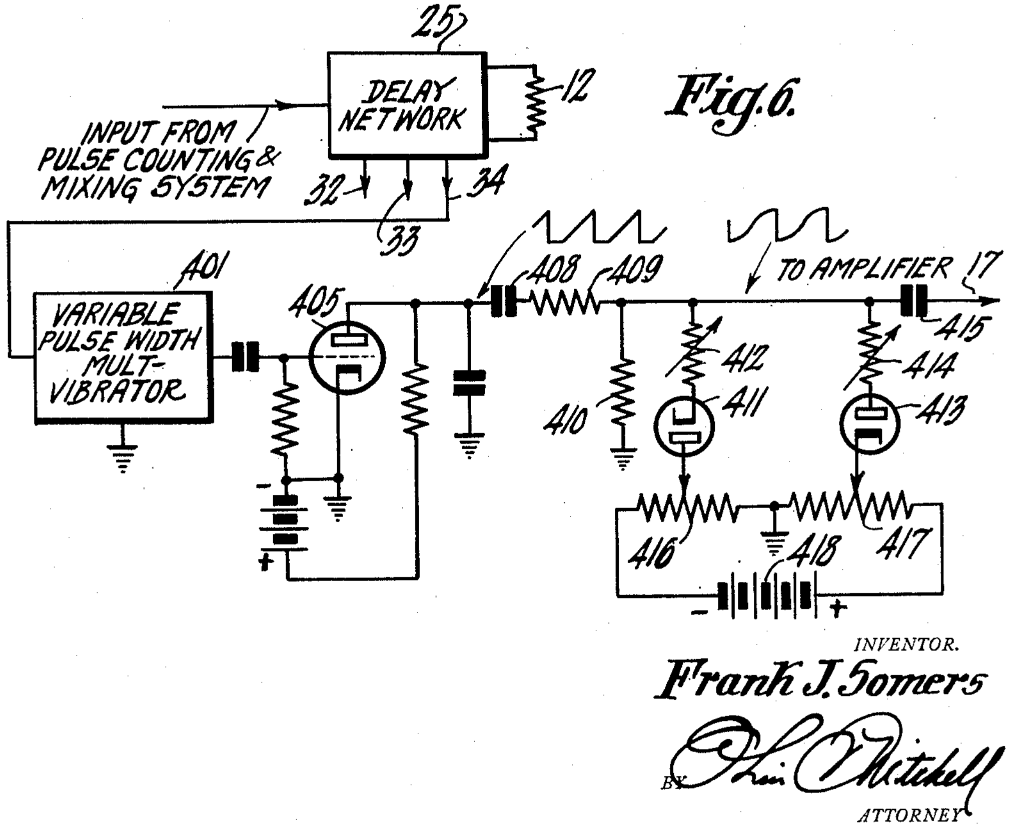
Figure 6 illustrates in block and schematic form a representative form which another portion of the film drive actuating system of Figure 1 may take.

As shown by waveform G in Figure 3, the output wave of pulse shaper 18 is a modified sawtooth wave with rounded ends in order to accelerate and decelerate the film gradually. The desired waveform may be obtained in a number of ways. One of the simplest ways is to generate a sawtooth wave and then modify it by means of properly biased diodes. This is indicated in Figure 6.

Here 401 is a variable width multivibrator whose positive pulse output feeds the discharge tube 405. The output of 405 is a sawtooth wave which is fed to resistor 410 via capacitor 408 and resistor 409. Diode 411 rounds off the negative tips of the sawtooth wave while diode 413 rounds off the positive tips as indicated. Resistors 412, 414, 416 and 417 and bias battery 418 are used to modify the degree of rounding as required. The output wave feeds amplifier 17 via capacitor 415. The amplifier 17 may be essentially the same as amplifier 10 and the same type of feedback system may be employed.

What is claimed is:

1. In a television film pickup system of the type including a light source, a television pickup tube, and a source of television field frequency pulses, and wherein said film is to be intermittently moved in a path between said light source and said tube, the combination comprising means for periodically energizing said light source in accordance with said field frequency pulses, counting means responsive to said field frequency pulses for deriving actuating pulses separated alternately by intervals of two field frequency cycles and three field frequency cycles respectively, and means responsive to said actuating pulses for controlling the advancement of said film in said path.

2. Apparatus in accordance with claim 1 wherein said controlling means includes a film advancing claw, an electromagnetic actuator for controlling the engagement of said claw with said film, and an additional electromagnetic actuator for controlling the propulsion of said film by said claw.

3. Apparatus in accordance with claim 2 wherein said controlling means also includes a third electromagnetic actuator for controlling the clamping of said film in said path.

4. Apparatus in accordance with claim 3 wherein said controlling means also includes signal delay means for timing the successive operations of said electromagnetic actuators.

5. In a television film pickup system of the type including a light source, a television pickup tube, a film gate interposed between said light source and said pickup tube, and a source of television field frequency pulses, and wherein said film is to be intermittently moved past said film gate, the combination comprising means for periodically energizing said light source in accordance with said field frequency pulses, a 2:1 counter, a 3:1 counter, signal adding means coupled to the outputs of both said counters, means for alternately applying said field frequency pulses to said 2:1 counter and said 3:1 counter whereby a series of actuating pulses are developed in said signal adding means, successive ones of said actuating pulses being separated alternately by intervals of two field frequency cycles and three field frequency cycles respectively, a film advancing claw, controllable means for engaging said film with said claw, controllable means for imparting film advancing motion to said claw, and controllable means for clamping said film in said film gate, all of said controllable means being responsive to said actuating pulses.

6. Apparatus in accordance with claim 5 and including pulse delay means and pulse shaping means associated with said last-named controllable means whereby the clamping action of said last-named controllable means ceases for spaced film-freed periods of predetermined time duration.

7. Apparatus in accordance with claim 6 wherein said combination also includes pulse delay means and pulse shaping means associated with said first-named controllable means whereby the engaging action of said first-named controllable means occurs within said film-freed periods for film-engaging periods of predetermined time duration shorter than the time duration of said film-freed periods.

8. Apparatus in accordance with claim 7 wherein said combination also includes pulse delay means and pulse shaping means associated with said second named controllable means whereby impartation of film advancing motion to said claw occurs within said film-engaging periods for film-advancing periods of predetermined time duration shorter than the time duration of said film-engaging periods.

9. Apparatus in accordance with claim 8 wherein the pulse shaping means associated with said second named controllable means includes means for developing rounded sawtooth waves whereby said film is smoothly accelerated and decelerated during said film-advancing periods.

10. In a television film pickup system of the type including a light source, a television pickup tube, a film gate interposed between said light source and said pickup tube, and a source of television field frequency pulses, and wherein said film is to be intermittently moved past said film gate, the combination comprising means for periodically energizing said light source in accordance with said field frequency pulses, a 2:1 counter, a 3:1 counter, signal adding means coupled to the outputs of both said counters, means for alternately applying said field frequency pulses to said 2:1 counter and said 3:1 counter whereby a series of actuating pulses are developed in said signal adding means, successive ones of said actuating pulses being separated alternately by intervals of two field frequency cycles and three field frequency cycles respectively, a film advancing claw, controllable means for engaging said film with said claw, controllable means for imparting film advancing motion to said claw, controllable means for clamping said film in said film gate, means for coupling each of said controllable means to said signal adding means, and a signal delay line, said means for coupling said last-named controllable means including a predetermined electrical length of said delay line, said means for coupling said first-named controllable means including a greater electrical length of said delay line, and said means for coupling said second-named controllable means including a still greater electrical length of said delay line.

11. Apparatus in accordance with claim 10 wherein all said coupling means include signal amplifying means, and wherein negative feedback is provided between each of said controllable means and its associated signal amplifying means.

References Cited in the file of this patent

UNITED STATES PATENTS

| | | |
|---|---|---|
| 1,716,989 | Trolaud | June 11, 1929 |
| 2,483,149 | Norgaard | Sept. 27, 1949 |
| 2,496,102 | McCord | Jan. 31, 1950 |
| 2,499,181 | Downes et al. | Feb. 28, 1950 |
| 2,588,813 | Dube | Mar. 11, 1952 |
| 2,735,333 | Mitchell | Feb. 21, 1956 |

FOREIGN PATENTS

| | | |
|---|---|---|
| 354,170 | Great Britain | July 27, 1931 |
| 564,640 | Germany | Nov. 21, 1932 |
| 657,294 | Great Britain | Sept. 19, 1951 |
| 867,051 | Germany | Feb. 16, 1953 |